United States Patent [19]

Bringmann

[11] Patent Number: 5,293,466
[45] Date of Patent: Mar. 8, 1994

[54] METHOD AND APPARATUS FOR SELECTING INTERPRETER FOR PRINTER COMMAND LANGUAGE BASED UPON SAMPLE OF PRINT JOB TRANSMITTED TO PRINTER

[75] Inventor: Michael W. Bringmann, Mobile, Ala.

[73] Assignee: QMS, Inc., Mobile, Ala.

[21] Appl. No.: 562,371

[22] Filed: Aug. 3, 1990

[51] Int. Cl.$^5$ .............................................. G06F 15/62
[52] U.S. Cl. ........................................ 395/114; 395/112
[58] Field of Search ................. 395/105, 106, 112–117

[56] References Cited

U.S. PATENT DOCUMENTS

| | | | |
|---|---|---|---|
| 4,992,957 | 2/1991 | Aoyama et al. | 395/112 |
| 5,075,874 | 12/1991 | Steeves et al. | 395/112 |
| 5,150,455 | 9/1992 | Morikawa et al. | 395/114 |

OTHER PUBLICATIONS

"Associative recall based on abstract object descriptions learned from observation: The CBM neural net model", Peggy Israel and Chris Koutsougeras, Proceedings of the IEEE workshop on Tools for AI, Fairfax, Va. (Oct. 1989), pp. 465–472.

Primary Examiner—Gary V. Harkcom
Assistant Examiner—Almis Jankus
Attorney, Agent, or Firm—Webb, Burden, Ziesenheim & Webb

[57] ABSTRACT

A printer and method of operating same which receives print jobs from a host computer encoded in any one of several printer control languages. The printer has the capability of interpreting print jobs in each printer control language. The printer samples a portion of each print job and, using a resident algorithm and data sets obtained by statistical techniques, analyzes the sampled portion of the print job to identify the printer control language in which the print job is encoded.

29 Claims, 2 Drawing Sheets

METHOD AND APPARATUS FOR SELECTING INTERPRETER FOR PRINTER COMMAND LANGUAGE BASED UPON SAMPLE OF PRINT JOB TRANSMITTED TO PRINTER

MICROFICHE APPENDIX

Filed herewith is a microfiche appendix comprising 1 microfiche and 50 total frames.

FIELD OF THE INVENTION

This invention relates to computer printers and more specifically to computer printers capable of printing jobs which may be encoded in one or another printer command language.

BACKGROUND OF THE INVENTION

Printers associated with computers receive print jobs transmitted from the computers. The print jobs comprise data (character codes and graphic elements encoded in bit maps, etc.) and, usually, instructions encoded in a specific printer command language. However, when only data and certain standard instructions (tabs, line feeds, etc.) are transmitted, the print jobs are said to be in the form of "pure" text.

A printer command language is a set of instructions understood by a printer. It may include information about positioning of text and/or graphics and options to control the attributes (e.g., font style, font size, color, density) of the printed information. Examples of such languages are Postscript, HP PCL, HP GL, and Impress. A printer command language is considered to consist only of the defined command sequences and the specified number of parameters associated therewith. In a print job, the printer command sequences are interspersed with data.

In order for a printer to process a print job encoded in a particular printer command language, it must have a combination of hardware and software capable of understanding and processing the printer command language. Typically, the printer has a controller which itself is a digital computer programmed with interpreters or emulations for processing more than one command language. For example, the printer controller may first generate a bit map stored in its page memory from the print job. Other apparatus, with reference to the bit map, produces a hard copy. Examples of computer printers that are capable of converting bit maps to hard copy are laser printers, thermal printers and dot matrix printers.

Applications programs that run on host computers are end-user programs (or frequently used utility programs) which generate print jobs. Applications programs generate print jobs using a printer command language or in the form of pure text. It is likely that different applications programs used with a given host computer use different printer command languages and/or pure text output.

A print job must be transmitted to a printer that can interpret the language in which the job is encoded and, if the printer can handle more than one printer command language, the correct interpreter or emulation must be selected.

In the past, three methods have been used to assure that a print job is transmitted to a printer prepared to interpret the print job: 1) Users or host software selected from among a variety of printers connected to a computer system, each of which can handle print jobs encoded in a single printer command language. 2) Switches of some form are set manually upon the printer capable of handling more than one printer command language in order to select the printer command language desired by the user. To change the printer command language processed by a printer, the switches must be altered and the printer reset in some fashion. 3) Additional command sequences or job headers may be defined by the printer manufacturer to be sent at the start of print jobs to select a desired printer command language.

The prior methods of directing a print job to a printer prepared to receive it have shortcomings. Multiple printers each dedicated to one printer command language can be an expensive solution. A printer must be purchased for each language Moreover, some printers may be heavily used while others sit idle. The use of configuration switches to select a printer command language may lead to resource contention as the users of one printer command language may inhibit the use by others. The user closest to the printer can dominate use of the printer because, to assure that a printer is configured to receive a print job, a trip to the printer is required. The use of job headers involves non-standard command sequences across printers made by different manufacturers. It also involves modification of existing application software to generate the headers for each print job.

SUMMARY OF THE INVENTION

It is an object according to this invention to provide printers with the capability of recognizing the printer command language in which a print job (without special header) is encoded and to process the print job accordingly.

It is an advantage according to this invention, to improve the productivity and throughput of printer resources, especially in a networked environment.

It is a further advantage according to this invention to provide methods and apparatus for identifying the printer control language of print jobs from a sample of the print jobs.

It is still another advantage according to this invention, to provide methods and apparatus for automatically identifying the printer control language of print jobs which do not annoyingly delay the processing of the print job nor require the use of hardware that is prohibitively expensive.

Briefly, according to this invention, there is provided a method of operating a computing system comprising a host computer and a printer. The printer is arranged to receive an input stream of electrical signals defining a print job from said host computer. Print jobs are encoded by computer software applications being executed by the computer in any one of the plurality of printer control languages. The method comprises running an application program on said host computer to generate a print job. The next step is outputting or transmitting the print job to said printer without special headers or without first activating switches upon the printer. The next steps comprise sampling a short portion, say from 64 to 512 bytes, of the print job (usually at the start of the print job) received at the printer and using statistical techniques analyzing the sampled portion of the print job to identify the printer control language in which it is encoded. As used herein "statistical techniques" mean techniques for selecting those characteristics of a printer control language based on the off-line analysis of large sample sets of print jobs encoded in a given language. The final step is interpreting the entire print job in accordance with the printer control language identified by the sampling and analyzing steps.

A related method of operating a computing system according to this invention comprises the steps of:
   a) gathering samples of many print jobs encoded in various printer control languages,
   b) using statistical techniques, analyzing said samples to build data sets defining distinguishing characteristics for each printer control language,
   c) storing said data sets in said printer,
   d) providing means in said printer for capturing a portion (usually the initial portion) of a new print job and testing said portion against said data sets to identify the printer control language in which the new print job is encoded, and
   e) printing the new print job using an interpreter or emulation suitable for the printer control language identified in the preceding step.

There is also provided, according to this invention, an improvement in computer printers which receive input streams of electrical signals defining print jobs. The print jobs may be encoded by a specific computer application in any one of a plurality of printer control languages. The printer has the capability, usually implemented by a combination of local digital computer hardware and software, for interpreting each of said plurality of printer control languages to define a bit mapped image. The printer further comprises suitable apparatus for converting the bit mapped image into a visual display of said image. The improvement comprises the following. The printer is provided with a buffer means for capturing a portion of the start of any print job. The printer has stored therein an algorithm and a plurality of statistically derived characterizing data sets for analyzing the captured portion of the input stream to identify the printer control language in which it is encoded. Data sets are provided for each printer control language which the printer can interpret. In accordance with the control language identified by the analyzing means, the printer processes the print job in the appropriate control language.

According to this invention, the characterizing data sets comprise statistical data reflecting the likelihood of selected n-grams (short sequences of characters) occurring individually or in combination in print jobs encoded in a given printer control language. The data sets comprise lists of selected n-grams and weighted pattern vectors (ordered lists) of real numbers corresponding to the selected n-grams for each printer control language. The values in the weighted pattern vectors are indicative of the likelihood of n-grams occurring or co-occurring in a given language and the diagnostic value of the n-grams. According to a preferred embodiment, the data sets comprise a plurality of pattern vectors for each printer control language and a threshold value corresponding to each weighted pattern vector. There may be more than one data set for a given printer control language, for example, based upon print jobs created by different applications that differently use the same printer control language. The data within the data sets are weighted by the ability of n-grams to distinguish a given printer control language from other printer control languages.

An aspect of this invention is the selection of the particular n-grams to be used to characterize a particular printer control language. Preferably, the n-grams for which data is included in the printer control language data sets do not include sequences of signals representing device dependent characteristics or parameters, sequences of signals which are application dependent, and subsets of longer n-grams. Preferably, the n-grams included in the data sets comprise command sequences which have correlation with a printer control language.

At run-time, the captured portion of the input stream is analyzed to develop a sample vector indicative of the presence and frequency of certain n-grams in the captured or sampled portion of the input stream. This sample vector is used with the weighted pattern vectors associated with each printer control language to calculate scores which can be used to select the correct interpreter for processing the input stream. The values in the sample vectors correspond to the same n-grams for which data is included in the weighted pattern vectors. In one embodiment, a score is computed for each language and the language receiving an extreme score (highest or lowest, depending upon the details of the calculation) is selected. A procedure is provided to handle tie scores. A procedure is also provided to handle an inability to select a language according to the n-gram patterns found in the sample vector.

According to a preferred embodiment, for each printer command language a score is computed based upon the number of occurrences and/or co-occurrences of selected n-grams in the sampled portion of the print job as represented by a sample vector with each weighted pattern vector of data sets for each printer command language until the score computed with a given weighted pattern vector when compared to a threshold associated with the given weighted pattern vector indicates the print job is encoded in the printer command language to which that weighted pattern vector corresponds.

THE DRAWINGS

Further features and other objects and advantages will become apparent from the following detailed description of the preferred embodiments in which.

DESCRIPTION OF THE PREFERRED EMBODIMENTS

Figure 1:
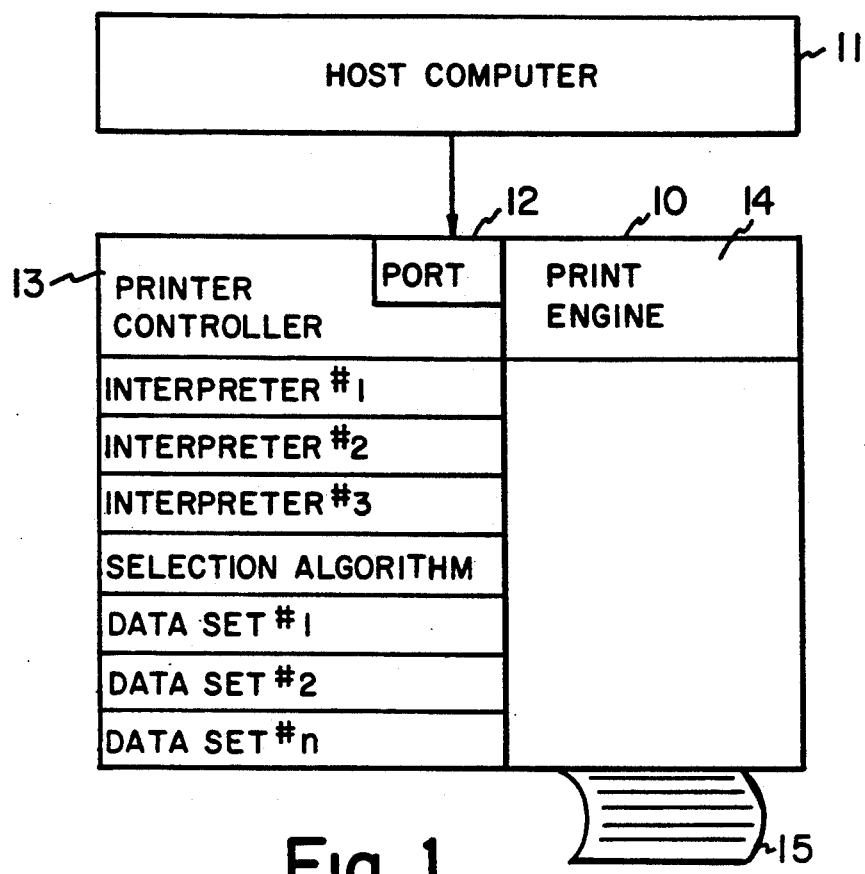
FIG. 1 is a schematic drawing illustrating the organization of a computing system and a printer with self-selecting of print job interpreter.

Referring to FIG. 1, there is shown schematically a computer printer 10 connected to a host computer 11 for receiving print jobs through the port 12. The printer may be considered to comprise a printer controller 13 and a print engine 14. The printer controller receives the print job and controls the print engine to generate the hard copy 15 of the print job. A number of types of print engines are known including thermal printers, laser printers and dot matrix printers. This invention is not specific to any particular printer or type of print engine.

Printer controllers are electronic circuits usually including a local microcomputer, including digital processor, memory for storing control programs and a page memory for storing all or a portion of the bit mapped definition of the text and graphics to be printed. A portion of the control programs for the printer controllers are standard interpreters of established printer control languages or emulations thereof. The details of the printer controller or the interpreters for the various printer command languages are not a part of this invention. As shown in FIG. 1, the printer controller may have stored therein the interpreter or emulator for more than one printer control language. In this case, there must be means to select the correct interpreter for an incoming print job.

According to this invention, the controller has a buffered input so that a short initial portion of the input data stream comprising a new print job, say 64 to 512 bytes, can be captured and analyzed to determine the printer control language in which it is encoded. Also, stored in the controller memory, is an algorithm or algorithms and characterizing data sets that permit the determination of the correct interpreter or emulation to be used with the print job.

Practice of the preferred embodiment according to this invention may be broken down into two stages: off-line training and on-line application. Off-line training comprises the development of the characterizing data sets using statistical methods to be stored in the printer controller. On-line application comprises the run-time use of the data sets and a suitable algorithm to identify the control language of new print jobs. Practically speaking, the data sets must be developed and tested on a computer prior to being installed in and used by a printer.

Off-line training comprises determining the identifying characteristics of each printer command language and appropriate weights to be given those characteristics. Print jobs at the most primitive level consist of data comprising sequences of data (character codes and graphic elements) and command sequences (instructions) in the printer control language. Some command sequences are unique to a given printer control language and others are not. During off-line training, a representative sample of print jobs encoded in each printer control language of interest and jobs in pure text form are analyzed using statistical methods to empirically derive characteristic sequences of each printer command languages referred to herein as n-grams.

Applications programs tend to make use of different subsets of the available command sequences in a printer command language. This subset selection is dependent upon the software architecture of the applications and the use of custom or generic printer driver interfaces. In any event, it is desirable to obtain samples of print jobs encoded in the various command languages generated by diverse applications such as word processors, spreadsheets, graphics packages, page layout utilities, CAD/CAM packages and other important applications. A variety of samples from each application in the environment of interest should be gathered. Samples should be drawn from different application modes (e.g., text, graphics, mixed), different printer initializations and page setups (e.g., portrait, landscape, and some different margins), different document lengths (e.g., one page, two pages) and other major features. A large number of samples of each application, release and configuration is desired to guard against statistical anomalies.

Selecting n-gram Sets

The analysis of the samples may be automated by use of a computer program, performed by simple examination or both. Practically speaking, the automation is required for off-line analysis and generation of printer control language data sets. Characteristic sequences or n-grams are chosen such that each occurs in a significant portion of the samples for a given control language or where the n-gram is expected to occur in a previously not considered subset of the samples. To reduce the potential combinatorial explosion in the number of n-grams found, analysis may be limited to subsets of the initial set of characters in the sampled print jobs, for example, the first 64, 128, 256 or 512 bytes, of the print jobs. A justification for this restriction is that the first few lines of a print job will tend to perform similar actions (relying on the same commands) across a wide variety of applications (e.g., prologues, initializations). In addition, it will also reduce memory storage requirements and interpreter selection time.

More precisely, n-grams are one or more distinct character codes (perhaps ASCII character codes) concatenated in a fixed order to produce a string of length one or more. Some desirable attributes of the characteristic n-grams include the following:

a) Longer strings are preferred to shorter strings as being more likely to be unique to a printer command language.
b) Strings that are substrings of other strings should be avoided, where possible. Substrings may be desired where unique semantics are entailed.
c) Single character strings should be avoided where possible because the proper weights for these features would require analysis of vast numbers of samples to eliminate special case bias.
d) Sequences containing printable numeric codes should be avoided as numerics usually correspond to parameters that are application or site specific.
e) Proper names, dates or other identification references should be avoided as application or site specific.
f) Command sequences that have strong correlation to printer command languages should be utilized.
g) Optionally, upper and lower case characters may be mapped to the same character code.
h) Manual intervention can be used to fine tune the n-gram selection.

A computer program may be used for extracting and identifying a set of n-grams from the print job samples and producing frequency vectors the elements of which are the frequency of each n-gram across the sample set for that printer control language. The program is written to examine a number of sample files containing the initial snapshot of print jobs. Given a set of print job samples for a specific printer command language and a set of options to indicate the useful characteristics of desirable command sequences, a set of n-grams is derived from the snapshots. The n-grams are selected according to the frequency of occurrence across a number of print job samples or based upon patterns of co-occurrence and their ability to diagnose previously unrecognized subsets of the samples. So, for example, in a fast method of analysis, n-grams may only be selected if found in a minimum percent of samples examined. Typically, the minimum percent chosen is between 50 and 80.

An alternative correlation algorithm would select n-grams which are highly diagnostic of large subsets of samples but which do not represent a duplication of information (low co-occurrence with previously selected n-grams). Minimum percent requirements do not apply as each candidate n-gram is evaluated in the context of sample subsets which are not appropriately represented by the previously selected n-grams.

If an n-gram is highly diagnostic of a particular but rarely used subset of samples that are difficult to classify, it may be included even though it is rarely seen.

Co-occurrence probability or conditional probability is defined to be the probability that a given string A can be found in a sample given that another string B also occurs. The probability is defined as occ(A&B) / occ(B) where occ(X) is the integer number of samples where the event X is true. This information is gathered by cycling through the current set of samples, and computing all frequencies of occ(B) and occ(A&B).

A program named "Analysis" has been written to select the n-grams from samples of a given command language. This program examines the beginning of sample data files in order to locate commonly used data patterns and counts the number of occurrences. A number of options may be provided to control how much effort the program will exert to find character patterns. The program seeks to select diagnostic sets of n-grams based either a) upon frequency of occurrence, co-occurrence probabilities of the n-grams and string lengths or b) according to the frequency of occurrence across samples. Analysis makes use of procedures Processfile (which in turn makes use of Patternscan and Wordscan), Trim_by_options, Trim_percent and Selectstrings which are all described herein.

```
main(Argc:Integer;
     Argv:CharacterPtrArray)

/*Initialize program configuration:
    Default values for options,
    Sample counters set to zero,
    An empty tree structure, Pats, to track the character
patterns found, and
    Create the temporary file Smpl to record sample
dependent information.*/

/*Process any arguments and analyze the sample files*/

If no arguments are found
  Then
    Indicate correct program usage & terminate
  EndIf For i:=1 To Argc Do    /*Iterate through the command
                            arguments/options*/
    If Argv[i] is an argument
    Then
      Case of argument type
        Set a program option
      EndCase
    Else
      /*Scan the sample file named by the argument for
character patterns.
```

*Add the patterns to the Pats tree structure
*Record locations of pattern occurrence in Smpl file for co-occurrence
  * selection algorithm*/
    Pats :=Processfile(Argv[i], Pats, Options)
  EndIf
 EndFor
/*Eliminate redundant or low-value strings from the set just found before determining 'cover' (n-gram selection), if so desired. Handle options such as minimum string length and overlapping strings (i.e. substrings). Essentially, this involves iterating through all of the n-grams found (Pats), applying tests when corresponding options are set, and possibly deleting the n-grams from Pats if they fail any of the tests. The set of strings in Pats which pass the "trim" options are stored in Slct.*/

Slct=trim_by_options(Options, Pats);

If the patterns are to be selected based upon co-occurrence or correlation data
Then
 /*Try to select from among the patterns provided to locate those which provide both coverage of the samples but which do not duplicate 'information' provided by other strings also. */

Slct=selectstrings(Options, Slct, Smpl);

Else
    /* Remove the patterns which do not occur in a minimum percent of the observed samples.
         */
  Slct=trim_percent(Options, Slct);
 EndIf If Slct is not an empty tree
  Then Print a summary of the strings selected as well as descriptive options
  EndIf
/*Terminate analysis and Clean up program*/
}

Processfile is a procedure for scanning a single sample file for string patterns.
/* COMMENTS: Scan a sample file for arbitrary string patterns and words according to the current options. Add the sample information to a tree of information with unique codes for each string. Write a summary of the strings encountered in the current sample to a text file. Update other necessary statistics in the system.

Arbitrary string patterns denotes any consecutive sequence of characters observed. Words denote sequences of characters separated by white space (e.g. space, line feed) which begin with alphabetic characters and contain only alphabetic characters or numeric characters.

Input Parameters:
    fname = the name of the sample file to be read
    Options = Defining the conditions under which the
        samples will be examined. Also records
        statistics to be updated about the total
        analysis
    Pats = a structure which records all of the string
        patterns which have been seen across all of the
        samples to date.
    Smpl = a structure where sample dependent, summary
information each is to be written.

Returned Values: an updated structure which records all
    of the string patterns which have been seen to date
    after processing this sample.
*/
processfile(fname : CharacterString;
            Options : OptionStructure;
            Pats : CharacterPatternStructure;

Smpl : SamplePatternRecordStructure)
returns CharacterPatternStructure

/* Initialize any necessary data structures and variables */

/* Open the sample file, if possible */

/* Read a portion of the sample into memory, a snapshot, which will be scanned for character patterns */
  snap := read(file, snapshot_size)

/* Close the sample file */

If we are to scan for arbitrary character patterns
Then
/* Scan the snapshot for arbitrary character patterns up to some length of k bytes. */
  ObservedStrings := patternscan(snap, Options)
EndIf If we are to search for variable length words
Then
/* Scan initial snapshot of file for variable length words (up to a maximum size) separated by word delimiters. */
   ObservedWords := wordscan(snap, Options);
EndIf /* Merge the two sets of patterns to guard against duplication */
  ObservedStrings :=merge(ObservedStrings, ObservedWords)

/* Add the patterns found in this sample to Pats, the summary for all samples. Provide unique code assignments for each new string encountered. */
Pats :=merge(Pats, ObservedStrings);

/* Write a summary of the strings encountered in the current sample to Smpl. */
  WriteSampleSummary(Smpl, ObservedStrings)

/* Update analysis statistics including:
      # of samples
      total # of character patterns known in Pats */
  return Pats
}

Patternscan is a procedure for extracting character patterns defined by any sequence of contiguous characters in the sample.

/* COMMENTS: Given the current options set for the string analysis program, a snapshot of a new sample file, and the previously found pattern data, scan the sample for all character patterns of lengths from 1 to k bytes. Update the statistics maintained.

Patterns are found by moving a variable length "window" of length 1 to k bytes across the sample. Each time a pattern is found it is recorded, either a new entry is added or an old entry is incremented.

Various options may be used to pre-screen the strings located including the occurrence or non-occurrence of kinds of characters (e.g. numerics) or the combination of different kinds of characters (e.g. control characters and numerics). Such strings which do not meet the pre-screening criteria will not even be recorded, thus hopefully reducing our total analysis workload.

Input Parameters:
    snap = the sample snapshot to be processed
    Options = the conditions under which the samples will be examined.

Returned Values:
    a structure which holds the statistics about the arbitrarily bounded length string patterns which have been seen.

*/

```
patternscan(snap : CharacterArray;
            Options: OptionStructure)
      returns CharacterPatternStructure /* Initialize necessary structures and variables for this
   procedure */
Pats :=emptyCharacterPatternStructure();

For i:=1 To (# of characters in current snapshot)
                /* Number read or arbitrary limit */ c := snap[i]      /* Get next character */

If c is lower-case-alphabetic AND
   we want to fold lower-case to uppercase
Then
   c := Uppercase(c)
EndIf If c is acceptable as a single character according to
   our options
Then
 Pats := AddPattern(c, Pats)  /* Add it to list of
                                 patterns.
                                 Maintain occurrence
                                 frequencies */
/* Handle substrings of current window.  Instead of
   scanning the input "snapshot" several times for each
   window size, maintain a single maximum size window and
   examine substrings of it.
   */

/* Each time that a new character is appended to the
   current window, the first character falls off the
   front. */
   For i := 1 To WindowWidth - 1 Do
     Window[i] := Window[i + 1]
```

```
    EndFor
    Window[WindowWidth]:=c
/* The window is then examined to determine if
undesirable patterns are present (e.g. identical,
contiguous characters; mixed punctuation and
alphanumerics). */

If undesirable patterns are present
    Then
      Window := empty      /* Throw away the entire current
                              window */
    Else
      /* All new patterns ending in the new character are
      added to the list. If a pattern has already been
      seen, then just increment its occurrence frequence.
      */
      For i := 2 To WindowWidth Do
        Pats:= AddPattern(Window[WindowWidth-i+1:Window
              Width], Pats)
      EndFor EndIf
  Else
    Window := empty      /* Throw away the entire current
                            window */
  EndIf EndFor /* Increment statistics based upon the number of samples
read */
```

Wordscan is a procedure for extracting character patterns which look like "words".

/* COMMENTS: Given the current configuration of the string analysis program, a snapshot of a new sample file, and the previously found pattern data, scan the sample for variable length word patterns. Update the statistics maintained.

For our purposes, a word is defined to be one of the following:

1. A string of letters and digits beginning with a letter.
2. Any single character which is either a digit or which is not alphanumeric.
3. If the numeric suppression option is enabled, words may not include numerics either.

Input Parameters:
    snap = a sample snapshot to be processed
    Options = a structure defining the conditions under which the samples will be examined.

Returned Values:
    a structure which holds the statistics about the arbitrarily bounded length string patterns (in this case words) which have been seen.
*/

```
wordscan(snap : CharacterArray;
         Options: OptionStructure)
    returns CharacterPatternStructure
{
/* Initialize variables and data structures */

Words := emptyCharacterPatternStructure();

charsrd := length(snap) in characters

/* Find the words */

While charsrd > 0 Do
   /* Get the next word.  The procedure getword is given
      the snapshot sample and the number of characters
      still left to read.  It looks in the sample for the
      next available word (i.e. skips over non-words) and
      places the result into newword.  A code indicating
      either that a words was found (LETTER) or something
      else was found (i.e. not LETTER) is placed in code.
```

The value of charsrd is decremented to account for the characters skipped and the length of the new word. */

```
getword(snap, charsrd, newword, code)

If code==LETTER
Then
   For i := 1 To (# of characters in newword)
    If newword[i] is lower-case-alphabetic AND
       we want to fold lower-case to uppercase
       Then
             newword[i] := Upper(newword[i])
         EndIf
       EndFor Words := AddPattern(newword, Words)

EndIf

EndWhile

/* Handle statistics based upon the number of samples
      read */ return Words;
}
```

Trim_percent is a procedure for deleting character patterns from a list which do not occur in a specified proportion of the language samples.

/* COMMENTS: Given a list of strings extracted from samples and the frequency of occurrence information, construct a copy of the list containing only those character patterns which occur in a minimum proportion of the total number of samples.

Input Parameters:
 Options = Defining the conditions under which the samples will be examined. Also records statistics to be updated about the total analysis
 Pats = a structure which records all of the string patterns which have been seen across all of the samples to date.
Returned Values: an updated structure which records a⊥ of the string patterns selected.
*/ trim_percent(Options : OptionStructure;
              Pats : CharacterPatternStructure)
     returns CharacterPatternStructure
{
/* Initialize any necessary data structures and variables
*/

Slct := emptyCharacterPatternStructure();

For i := 1 To (# of patterns in Pats) Do
 If Pats[i].num_sample/Options.total_samples  =Options.
    min_percent
 Then
    Slct := AddExistingPattern(Slct, Pats[i])
 EndIf EndFor return Slct
}

Selectstrings is a procedure which attempts to select a minimum 'cover' set of character patterns according to the co-occurrence properties shown in the samples.
/* COMMENTS: Select from among the mass of string patterns and words to try to determine which ones are most diagnostic of the samples. As few strings as possible will be selected as characteristic of portions of the samples. This is done by evaluating the co-occurrence properties of the strings. First the set of strings is initialized with a "popular" string. A portion of the sample group in which the preceding string occurs frequently is "removed". Next, a string which is "popular" or common in the reduced group of samples, but which is least correlated with the preceding "popular" string is found. This is added to the set and the sample group is reduced again. This process continues until all samples are adequately represented by string patterns.

Input Parameters:
- Options = Defining the conditions under which the samples will be examined. Also records statistics to be updated about the total analysis
- Pats = a structure which records all of the string patterns which have been seen across all of the samples to date.
- Smpl = a structure where sample dependent, summary information each is to be written.

Returned Values: an updated structure which records all of the string patterns selected.
*/

```
selectstring(Options : OptionStructure;
             Pats : CharacterPatternStructure;
             Smpl : SamplePatternRecordStructure)
       returns CharacterPatternStructure
{
/* Initialize structures and variables */

Slct := emptyCharacterPatternStructure();

While (have strings to consider) Do
  Smpl2 := Smpl            /* Get sample data set */

While (want another diagnostic set) Do
```

Calculate co-occurrence probabilities of all pairs of strings

```
c := find string with "highest" score where score is
        defined by descending # of samples in Smpl2
        where it occurs,
        descending pattern string length,
        descending mean co-occurrence of each strings
        in Pats for the samples in Smpl2,
     ASCII collating order (or other encoding)
Slct := Slct + c
```

RemoveSubset(c, Smpl2, Options)

/* Remove the sample subset containing c from the current sample data. "Remove sample subset..." is used because we want to eliminate the samples for which the selected string pattern was highly diagnostic. We will do this in the following manner.

1. Find the samples in which the current selected sting occurs

2. Sort these samples in descending order of the frequency of occurrence of the selected string within these samples 3. Take the mean co-occurrence probability of the selected string as a proportion.

4. Eliminate that proportion of the samples with the highest frequency

```
                  of occurrence from the sample set.
                  The eliminated samples will not be
                  considered in the next string
                  selection.
     */

Pats := Pats - c    /* Remove c from set of candidate
                            strings */

EndWhile

If want another diagnostic set
Then
  Set status appropriately
Else
  Clear status correspondingly
EndIf EndWhile return Slct
}
```

Assigning Weights

It would be desirable if the n-grams described features which are unique command sequences for each candidate printer control language. Unfortunately, this is not always possible. Hence, it is necessary to assign weights to n-grams or combinations of n-grams to designate their ability to distinguish one language from all others. The set of n-grams and weights attached to each enable the differentiation between print jobs encoded in a given language from all others.

Two methods of assigning weights are herein disclosed. The method used depends upon the confidence in the set of n-grams derived and the strictness of the requirement to make the correct selection. The method of assigning weights is directly related to the run-time method of selecting the correct interpreter to be used by the printer.

In the first method, a single pattern vector is generated which uses the relative observed occurrences of n-grams and other features to compute a single weight for each n-gram. For example, the weight ($w_s$) of each n-gram is computed as follows:

$$w_s = (n_s / (n_a + 1)) * (l_s^2)$$

where
$n_s$ = the number of occurrences of the n-grams,
$n_a$ = the total number of occurrences of all n-grams in all samples, and
$l_s$ = the length in characters of each n-gram.

The above weighting equation was determined by empirical evaluation of a number of sample printer command languages and example print jobs as providing a reasonable way to balance the frequency of occurrence of useful n-grams against the diagnostic importance of longer strings. It is not the only possibility as improvements in performance observed may be an artifact of the language studied. In other words, certain command sequences may be recognized as unique to one printer command language and may be assigned added weight. The results of applying this calculation for a printer command language is a single weight pattern vector (ordered list) of real numbers containing one value for each of the n-grams diagnostic of that language. This vector may be used in a single vector statistical frequency method to identify print jobs.

Figure 3:
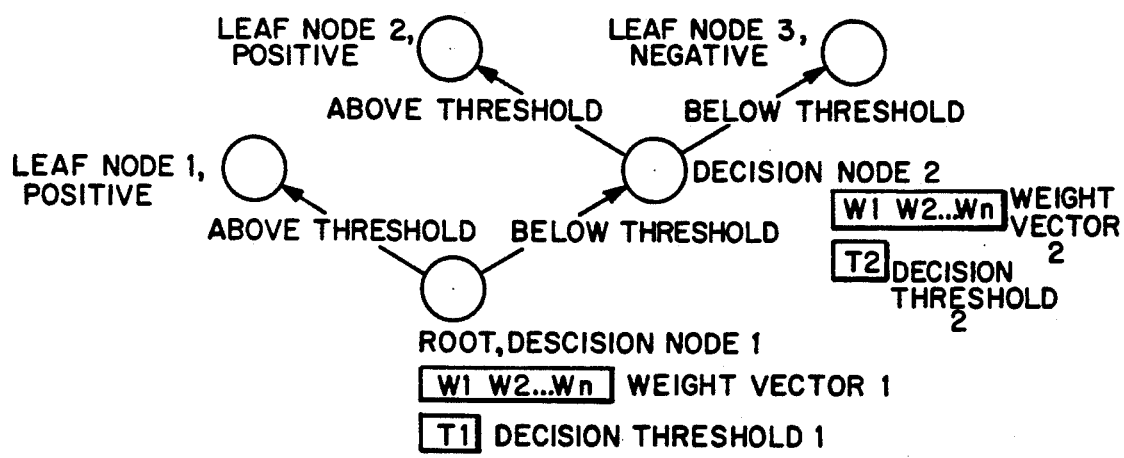
FIG. 3 is a simplified diagram illustrating the assignment of weighted pattern vectors to the decision structure used to implement the process illustrated in FIG. 2.

It may be the case that a single linear discriminant (i.e., a mathematical function based upon a single vector of weighted values) is not sufficient to differentiate print jobs. This may be due, for example, to the interaction between the characteristic n-grams selected. For this reason, a second method involving a more complex weighting scheme which produces multiple weighted pattern vectors for each printer command language has been implemented. Essentially, a tree of weighted pattern vectors is provided for each command language which will determine that the, candidate language should be selected because all other languages are eliminated or that the determination cannot be made. This process continues until a select or reject decision is determined for the current language. An algorithm to handle ties may also be provided. A procedure is provided to handle the inability to select a language based on the n-gram patterns in evidence. The process is illustrated schematically in FIG. 3 for the current language. The training set may be developed from the original samples for n-gram analysis and other samples provided for this specific purpose.

Figure 2:
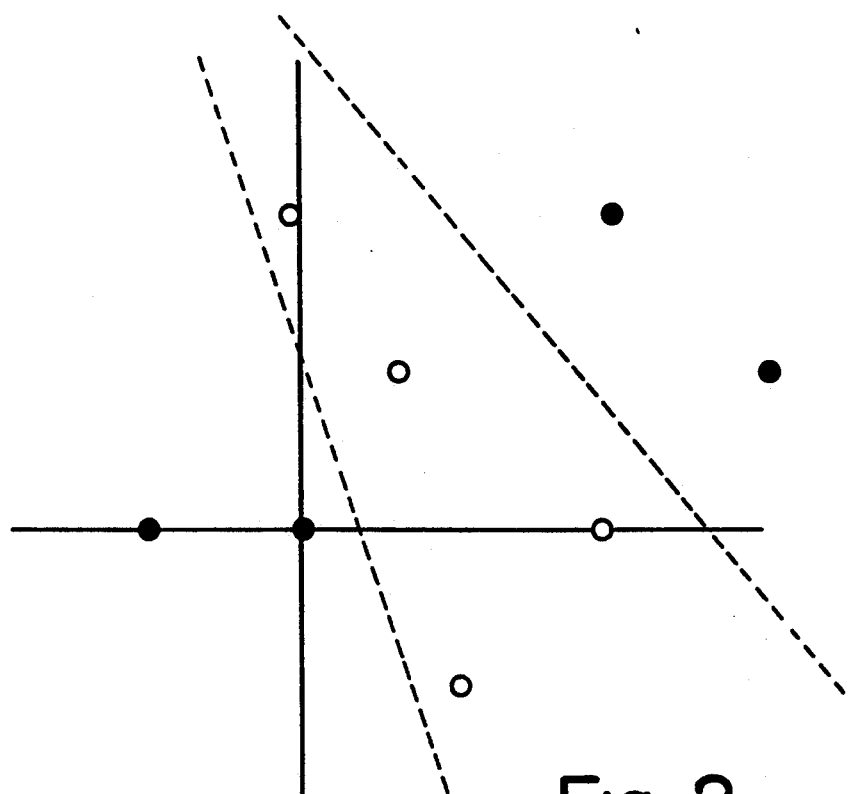
FIG. 2 is a diagram illustrating the multiple weighted pattern vectors or discriminants used when identifying the printer command language of print jobs.

In order to use this method, a training set for each printer command language to be considered must be formed. Each training set consists of a set of positive samples (samples known to be encoded in the command language) and a set of negative samples (samples known to be encoded in other command languages or as pure text). Each sample is mapped or represented as a vector of the frequency of occurrences of each of the n-grams selected for the language for which the vector tree is to be produced and a "similarity measure" or 1.0 for a positive sample and 0.0 for a negative sample. A linear discriminant (in effect, an equation defining a hyperplane in multidimensional space) which best separates a subset of the positive samples from the remainder of the samples in the training set is computed (defined by a vector with values or weights for each n-gram and a threshold value). The process of choosing hyperplane is shown schematically with reference to FIG. 2 which, of course, can only show the trivial two-dimensional case. If the first found hyperplane separates all positive and negative samples, no further separation is required. If not, a further hyperplane is found that separates the remaining subsets of positive and negative examples. This process is repeated until all subsets bounded by hyperplanes contain only one set of positive or negative samples. This process results in a plurality of numeric decision vectors and thresholds.

The result of the weighting process (either method) is a prototype for each language. Computer programs to be run off-line assist in the calculation of the weighted vectors. The computer program for weighting the single weighted vector is straight forward. The computer program for the second (multiple vector) weighting scheme is, of course, more complicated. In an implementation of this weighting process, three separate computer programs are useful. The first program determines the mapping between selected n-grams of the languages and sets of positive and negative print jobs. The next program implements a version of the Athena classifier algorithm of C. Koutsougeras. (See Israel, P. and Koutsougeras, C. (1989) "Associative recall based on abstract object descriptions learned from observations: The CBM neural net model," *Proceedings of the IEEE workshop on Tools for AI*, Fairfax, Va. (October 1989).) The source code for the version of the Athena algorithm used by the applicant's and called Freya is set forth in the microfiche appendix.

Given a set of sample vectors representing positive and negative samples, a tree of weight vectors is derived. The tree allows evaluation of combinations of n-grams or "higher-order" attributes and their relations to the positive and negative samples. A final program assembles the list of n-grams selected for a given language and the tree of weighted vectors into a "language prototype" for use in the run-time environment. Using the tree of weights and a sample vector from a new print job, it is possible to infer whether the new print job is encoded in a print language represented by a weighted pattern vector tree.

One set of n-grams and corresponding weighted vectors may be insufficient to characterize all (or most) of the print jobs encoded in a given language. It is possible that several alternative sets of n-grams and weighted pattern vectors may be necessary or desirable to accurately identify the printer command language of print jobs encoded in a given language for the following reasons: 1) A single set of n-grams may be too large and unwieldy for "efficient" on-line application. 2) Some n-grams may be useful diagnostic factors but are not sufficiently unique to a single language. These sequences may be encoded but the degree to which they contribute to the certainty of the identification of the language is limited. 3) Different subsets of the command sequences may be used in different environments. Specialization of the set of diagnostic n-grams may improve performance in making decisions. 4) An n-gram may be added after encountering valid, but rare examples of command sequences. For these reasons and others, it is occasionally necessary to build more than one language prototype for a single printer command language.

Language Selection

Once language prototypes have been developed for each of the printer command languages to be considered, this information may be used to make a selection of the language which is the nearest match to a new print job. This is an iterative process. For each available language prototype and with a sample vector derived from the snapshot of a new print job, a similarity score is calculated. The language with an extreme score is said to "win" and the interpreter or emulator for that language is used to interpret the new print job. In more technical terms, a pointer to the interpreter for the winning language is returned by the iterative procedure that calculates the scores. It may be necessary to handle "ties" when two languages receive the same or a very similar score. In such a case, the ties can be resolved by reference to an auxiliary priority assigned to each language ordering their priorities (stored with the language prototype). Other strategies for resolving ties might comprise selecting the language with the "highest wins," "most recently used," "most frequently used," "first-come-first-served," or other method specified by the user.

Finally, the language prototypes may not provide coverage of all distinguishing n-grams of the languages considered. In such a case, it may not be possible to make a choice between languages. An error value must be returned by the iterative procedure that calculates the scores instead of a pointer to an interpreter. The procedure that uses this language inference procedure will have to detect the error value and initiate alternative processing, such as using an alternative algorithm to select an interpreter (e.g., default value) or it may elect to reject and ignore the print job (possibly after issuing a warning message).

A pseudo-code representation of a language selection algorithm is set forth hereafter.

```
function LanguageSelect (L: LangChars; J : PrintJob)
/* COMMENTS: The input parameters are L, a pointer to an
```

```
indexed array of the language prototypes, and J, a
pointer to the snapshot of the new print job. The
function returns an integer pointer. This function calls
two others TestLanguage and WinTie. TestLanguage is
described in more detail hereafter. Note: := means
assignment;
== means equals; != means does not equal.*/
vars
    ptr      :pLanChars
    i,ret    :Integer
    scr,max  :Real
begin
    ret := FAILURE_VALUE
    max := 0.0
    for i := 1 to (# of LangChars) do
        ptr := L[i]                    /* Get next
                                 prototype */
        scr := TestLanguage(ptr, J)    /* Call function
                    to compute similarity score*/
        if scr > max                   /* handle clear
                                         wins */
            then
                max := score
                ret := i
            else
                if ( (ret != FAILURE_VALUE) and
                     (scr == max) and
                     (WinTie(ret, i) ) ) /* Call function
                            to resolve ties */
                then
                    ret := i
                endif
        endif
    endfor
    return ret                         /* Return Pointer
                                         */
end LanguageSelect
```

With this, pseudo-code programmers can develop compilable code in any suitable programming language. Variations of the above pseudo-code algorithm may be needed to handle more complex tie-breaking procedures.

A single language prototype may consist of several characterizations and it will be necessary to compute a similarity score for each characterization and then use one of the scores or a combination of the scores (e.g., maximum, mean, mode, other) in comparison with the scores calculated for other languages.

Pseudo-code for a language testing algorithm is set forth below:

```
function TestLanguage (L: pLangChars; J: PrintJob)
/* COMMENTS: The input parameters are L, a pointer to a
language prototype, and J, a pointer to the snapshot of
the new print job. The function returns a real which is
the score for the language prototype pointed to by the
input parameter. Each language prototype has a field
wt_type that may have the value FREQUENCY or NEURAL
which will determine the function called to actually compute
the score - either FrequencyScore or NeuralNetScore. Both
of these functions as well as FrequencyCount are
described in detail hereafter */
var
    scr, ret : Real
    i        : Integer
    cnt      : IntegerVector
begin
    ret := 0.0
    for i := 1 to (# of characterizations in L) do
        cnt := FrequencyCount(L[i].strings,
                              J,L.snapshot_size)
        if L[i].wt_type == FREQUENCY
            then
                scr := FrequencyScore(L[i].Fweights,cnt)
            else
                scr := NeuralNetScore(L[i].Nweights,cnt)
        endif
        if scr > ret       /* Use maximum score
                              */
            then
                ret := scr
        endif
    endfor
    return ret
end TestLanguage
```

Note that multiple measures may be returned but this simply delays the point at which the choice of which value to use is made.

The sample vector with integer values which correspond to the frequency of the selected n-grams is extracted from the snapshot of the new print job by the function FrequencyCount. Starting at the beginning of the print job, a search is made for each n-gram in the language prototype and the count of how many occurrences of each n-gram is stored in the sample vector. Both upper case and lower case alphabetic characters may be mapped to the same character code. This process continues until the end of the snapshot or a fixed number of characters from the print job have been processed. FrequencyCount returns a vector (ordered list) of occurrences of each string feature in the snapshot. The pseudo-code fragment that follows illustrates this process.

```
function  FrequencyCount  (S:  StringSet;  J:
PrintJob;SSS:integer)
/* COMMENT: The input parameters are S, an array of the
characterizing n-grams for the given language, and J, a
pointer to the new print job and SSS, the preferred
snapshot size. The function returns an integer vector.
*/
var
    i,k, last : Integer
    fnd       : Boolean
    ret       : IntegerVector
begin
    for i := 1 to (# of n-grams in S) do
        ret[i] := 0          /* zero all vector
                                values */
    endfor
    last := Min(Length(J),SSS)
    i := 1
    while i <= last do
        fnd := FALSE
        k := 1
        while (not fnd) and (k!=(# of n-grams in S) do
            if StringLength(S[k]) != (last - i +1)
                then
                    if StringEqual(S[k],J[i])
/* Compares the n-gram at S[k]with strings starting at
J[i]*/
                        then
                            fnd := TRUE
                        else
                            k := k + 1
                    endif
        endwhile
        if fnd
            then
                ret[k] := ret[k] + 1    /* increment
                integer value in vector */
                i := i + StringLength(S[k])
            else
                i := i + 1              /*step past
                    single character n-gram in the
                    snapshot */
        endif
    endwhile
    return ret
``` end FrequencyCount

The vector returned by FrequencyCount is used with the weighted pattern vector or tree of weighted vectors stored in the language prototype to produce the similarity score. In the case of the first method of calculating scores, (single vector statistical frequency method) above described, the score can be calculated with the following pseudo-code algorithm.

```
function FrequencyScore(W : RealVector, O : IntegerVector)
/* COMMENTS: The input parameters are two vectors having
the same number of items. W is the weighted vector from
the language prototype and O is the vector derived from
the snapshot. This function returns a real value; namely
the score. */
var
    mb  : Real
    i   : Integer
begin
    mb := 0.0
    for i := 1 to (# of items in W) do
       mb := mb + ( (W[i] * O[i] * (1.0 — mb) )
               /* weighted sum */
    endfor
    return mb
end FrequencyScore
```

The value returned by FrequencyScore is a single real number in the range 0.0 to 1.0. The weighted sum calculation used to compute the score (or measure of belief) is adopted from the MYCIN system. It was selected to try to reduce the possibility that the occurrence of highly weighted n-grams might overly bias the score resulting from this single discriminant. A simple weighted sum (i.e., Euclidean distance measure) may alternatively be used according to the demand characteristics of the environment.

In the case of the second method of calculating scores (multiple weighted vector method) the score is calculated using a language prototype which is a tree of linear discriminants as described previously. The sample vector returned by FrequencyCount is applied to the weighted vector and threshold found at the root node of the tree. The "projection" of the print job based upon the weighted vector and the sample vector is calculated. If the projection is above the threshold value for the root node, processing moves to the left sub-tree pointed to by the root node or else processing moves to the right sub-tree pointed to by the root node. If the root node of the new tree is a leaf node, a classification has been determined. A new root node that is not a leaf node will result in further processing with the discriminant stored at that node. A pseudo-code outline of this algorithm is presented below:

```
function NeuralNetScore(W: pWeightTree; O: IntegerVector)
/* COMMENTS: The input parameters for this function are a
pointer to the root node of the language prototype being
tested and the sample vector returned by FrequencyCount.
The return is a Real, for example, either a 0.0 or 1.0.
The —> symbol preceding field name means the value stored
at that field of the node pointed to by the variable
preceding the symbol. */
var
    prj :Real
    i   :Integer
    ptr :pWeightTree
begin
    ptr := W
    while TRUE do
       prj := 0.0
       for i := 1 to (# of items in O) do
           prj := prj + (O[i] *ptr—>W[i])
       endfor
       if prj > ptr—>threshold
         then
              ptr := ptr—>left
         else
              ptr := ptr—>right
       endif
       if ptr—>leaf ==TRUE
         then
              return ptr—>score
       endif
    endwhile
end NeuralNetScore
```

EXAMPLE

The following example will illustrate the methods according to this invention. The numbers in the tables were drawn from the development of several working language prototypes. Assume that market analysis determines that the interpreter for a new printer control language should be added to the printer. The new language is important because a major insurance company desired as a customer uses word processing and database software based upon this new language. The source code for the new language interpreter is acquired from the owner. Assume that three printer control languages had already been acquired and had been used; namely HP GL, HP PCL, and Postscript. Copies of applications software with the printer drivers for the new language is acquired. Test documents and toy databases are included with the packages. Appropriate data capture utilities are used to capture and store snapshots of print jobs produced with the applications software.

An examination of the language manual for the new language indicates that it is an "escape" language similar to ANSI X.34. Commands consist of a standard preamble, a variable number of arguments, and a non-numeric suffix. The arguments to commands consist of numerics separated by semicolons. (In order to evaluate the language features (n-grams) actually used (as compared with those that are available), a configuration for the analysis program is developed.) The correlation analysis method of locating n-grams is used and n-grams up to a maximum length, say 6 characters long, are considered.

The analysis and weighting programs are then run on the samples of print jobs in the four printer control languages and samples in pure text form to create preliminary language prototypes. The single vector statistical frequency method is chosen. Thereafter each print job was evaluated by the TestLanguage algorithm using the FrequencyScore algorithm and the results were printed in a table form. The expected index for each language and pure text files was as follows:

| | |
|---|---|
| HP GL | 1 |
| HP PCL | 2 |
| Postscript | 3 |
| New Language | 4 |
| Pure Text | −1 |

The Table showing the effectiveness of the first weight method is as follows:

| | | | |
|---|---|---|---|
| Index = 1 | Have = 261 | Don't Have = 0 | Samples = 261 |
| Index = 2 | Have = 297 | Don't Have = 56 | Samples = 353 |
| Index = 3 | Have = 402 | Don't Have = 65 | Samples = 467 |
| Index = 4 | Have = 311 | Don't Have = 61 | Samples = 372 |
| Index = −1 | Have = 7 | Don't Have = 49 | Samples = 56 |

The evaluation set forth in the Table above indicates the unsuitability of the single vector statistical frequency method for distinguishing the print job samples for the case at hand. As a rule of thumb, if the single linear discriminant cannot select significantly better than half the samples for correct language, effort should be expended to extend (re-perform the analysis stage) or refine (remove highly "common" n-grams) the n-gram sets for each language prototype. More stringent requirements may be used at the discretion of the prototype developer. As the table illustrates, the single discriminant method yielded about an 80 or 90 percent success rate.

For this reason, the multiple vector or tree method was implemented. The analysis and weighting programs based upon the classification algorithm are run for the same samples. Each sample is then tested with the Test-Language algorithm and the NeuralNetScore algorithm and a Table was printed displaying the relative success.

| | | | |
|---|---|---|---|
| Index = 1 | Have = 261 | Don't Have = 0 | Samples = 261 |
| Index = 2 | Have = 353 | Don't Have = 0 | Samples = 353 |
| Failed select for postscr17! | | | |
| Index = 3 | Have = 466 | Don't Have = 1 | Samples = 467 |
| Failed select for db015! | | | |
| Failed select for db073! | | | |
| Index = 4 | Have = 370 | Don't Have = 2 | Samples = 372 |
| Index = −1 | Have = 56 | Don't Have = 0 | Samples = 56 |

Three failed classifications still exist and note that these are not all in the new language. Such errors may be encountered with the older languages when a new language is being added. In both instances, however, the same solution is indicated. It is necessary to add additional string attributes (n-grams) to the set of n-grams for the two languages, preferably derived from the samples that were failed. The additional attributes may include the following: 1) Command sequences which are observed infrequently, but which occur in the failed samples. 2) Punctuation for arguments to command sequences which may have been left out previously because they were deemed unimportant or could lead to confusion. 3) Special case arguments to command sequences which are unique to a printer command language. With these changes all samples are again tested and the Table is printed showing complete success as follows:

| | | | |
|---|---|---|---|
| Index = 1 | Have = 261 | Don't Have = 0 | Samples = 261 |
| Index = 2 | Have = 353 | Don't Have = 0 | Samples = 353 |
| Index = 3 | Have = 467 | Don't Have = 0 | Samples = 467 |
| Index = 4 | Have = 372 | Don't Have = 0 | Samples = 372 |
| Index = −1 | Have = 56 | Don't Have = 0 | Samples = 56 |

The method for the partially hypothetical example is now 100% diagnostic. In actual experience, with similar languages the multiple vector method has been found to be over 99% diagnostic (effective in identifying new print jobs on the basis of a short snapshot of the print job).

Note that the size and quality of the sample training set for each printer command language will affect the quality and completeness of the derived weights.

Having thus described my invention with detail and particularity required by the Patent Laws, what is claimed and desired to be protected by Letters Patent is set forth in the following claims.

I claim:

1. A method of operating a computing system comprising a host computer and a printer connected to receive an input stream of electrical signals defining a print job from said host computer encoded in any one of a plurality of printer control languages comprising the steps for:

causing an application program to run upon said host computer to generate a print job encoded in a selected printer control language, transmitting the print job to said printer, sampling a portion of the print job, analyzing the sampled portion of the print job using statistical techniques using stored data sets to identify the printer control language in which it is encoded, said stored data sets comprising statistical data setting forth a measure of the ability of selected n-grams occurring in print jobs to distinguish a given printer control language from all others, and interpreting the print job in accordance with the printer control language identified by the sampling and analyzing steps.

2. A method of operating a computing system comprising at least one host computer and at least one printer, said host computer outputting print jobs encoded in a plurality of printer control languages and said at least one printer processing print jobs encoded in more than one printer control language comprising the steps of:

a) generating samples of print jobs encoded in various printer control languages, b) analyzing said samples using statistical techniques to build data sets defining distinguishing characteristics for each printer control language, said data sets comprising statistical data setting forth a measure of the ability of selected n-grams occurring in print jobs to distinguish a given printer control language from all others, c) storing said data sets in said printer, d) capturing the initial portion of a new print job being transmitted to said at least one printer and testing said initial portion against said data sets to identify the printer control language in which the new print job is encoded, and e) printing the new print job using an interpreter or emulation suitable for the printer control language identified in the preceding step.

3. A method of operating a computing system comprising a host computer and a printer connected to receive an input stream of electrical signals defining print jobs from said host computer encoded by specific computer applications in a plurality of printer control languages and in pure text format comprising the steps for:

sampling a portion of the print jobs created by a plurality of applications programs for each printer control language and in pure text format using statistical techniques to build data sets that can be used to distinguish sampled print jobs according to the printer control language in which they have been encoded, said data sets comprising statistical data setting forth a measure of the ability of selected n-grams occurring in print jobs to distinguish a given printer control language from all others, storing the data sets in the printer, running an applications program on said host computer to generate or acquire a new print job, transmitting the new print job to said printer, sampling the initial portion of the new print job being transmitted to the printer, analyzing the sampled portion of the new print job using the stored data sets to identify the printer control language or pure text format in which it is encoded, and interpreting the input stream in accordance with the printer control language, if any, identified by the sampling and analyzing steps.

4. A method of operating a printer configured for processing print jobs encoded in more than one printer control language comprising the steps of:

a) storing data sets obtained by statistical techniques in the printer, said data sets defining distinguishing characteristics of said more than one printer control language, said data sets comprising statistical data setting forth a measure of the ability of selected n-grams occurring in print jobs to distinguish a given printer control language from all others, b) capturing an initial portion of a new print job and testing said initial portion against said data sets to identify the printer control language in which the new print job is encoded, and c) printing the new print job using an interpreter or emulation suitable for the printer control language identified in the preceding step.

5. A method according to claims 2, 3 or 4 wherein the data sets comprise statistical data setting forth a measure of the likelihood of combinations of selected n-grams occurring in print jobs are indicative of print jobs encoded in a given printer control language.

6. A method according to claim 5 wherein the data sets comprise a plurality of vectors of real numbers corresponding to the selected n-grams for each printer control language and a threshold value corresponding to each vector.

7. A method according to claim 6 wherein for each printer command language a score is computed based upon the number of occurrences of each n-gram in the sampled portion of the print job and each vector of data sets for each printer command language until the score computed with a given vector when compared to the corresponding threshold indicates the print job is encoded in the printer command language to which that vector corresponds and directing the interpreting means to interpret the print job in accordance with that printer control language.

8. A method according to claims 2, 3 or 4 wherein the data sets comprise vectors of real numbers corresponding to the selected n-grams for each printer control language.

9. A method according to claim 8 wherein for each printer command language a score is computed based upon the number of occurrences of each n-gram in the sample portion of the print job and the data sets for each printer command language, said scores being indicative of the likelihood of the print job being coded in each command language and directing the interpreting means to interpret the print job in accordance with the printer control language having the score indicating it is the most likely language in which the print job is encoded.

10. A method according to claims 2, 3 or 4 wherein the data sets comprise statistical data setting forth a measure of the likelihood of selected n-grams occurring in print jobs are indicative of print jobs encoded in a given printer control language by a given application.

11. A method according to claims 2, 3 or 4 wherein the data sets comprise statistical data setting forth a measure of the likelihood of combinations of selected n-grams occurring in print jobs are indicative of print jobs encoded in one printer control language by a given application or another.

12. A method according to claims 2, 3 or 4 wherein the data sets comprise statistical data setting forth a measure of the likelihood of selected n-grams occurring in print jobs are indicative of print jobs encoded in a given printer control language by a given application, said data weighted by the ability of said n-grams to distinguish a given printer control language from other printer control languages.

13. A method according to claims 2, 3 or 4 wherein the n-grams included in the data sets avoid sequences of signals representing device dependent characters or parameters.

14. A method according to claims 2, 3 or 4 wherein the n-grams included in the data sets avoid sequences of signals representing which are application dependent.

15. A method according to claims 2, 3 or 4 wherein the n-grams included in the data sets comprise command sequences which have a correlation with a printer control language.

16. A method according to claims 2, 3 or 4 wherein the n-grams included in the data sets map upper and lower case characters to the same character code.

17. In a printer for receiving an input stream of electrical signals defining a print job from a host computer, said input stream encoded by a computer application in any one of a plurality of printer control languages, said printer comprising means for interpreting each of said plurality of printer control languages to define a bit mapped image, means for converting the bit mapped image into a visual display of said image, the improvement comprising:

means for sampling a portion of an input stream, means using a printer resident algorithm and a plurality of data sets obtained by statistical techniques for analyzing the sampled portion of the input stream to identify the printer control language in which it is coded, there being at least one data set for each printer control language, said data sets comprising statistical data setting forth a measure of the ability of selected n-grams occurring in print jobs to distinguish a given printer control language from all others, and means for directing the interpreting means to interpret the input stream in accordance with the printer control language identified by the sampling and analyzing means.

18. A printer according to claim 17 wherein the data sets comprise statistical data setting forth a measure of the likelihood of combinations of selected n-grams occurring in print jobs encoded in one printer control language.

19. A printer according to claim 18 wherein the data sets comprise a plurality of vectors of real numbers corresponding to the selected n-grams for each printer control language and a threshold value corresponding to each vector.

20. A printer according to claim 19 wherein for each printer command language a score is computed based upon the number of occurrences of each n-gram in the sample portion of the print job and each vector of data sets for each printer command language until the score computed with a given vector when compared to the corresponding threshold indicates the print job is encoded in the printer command language to which that vector corresponds and directing the interpreting means to interpret the print job in accordance with that printer control language.

21. A printer according to claim 17 wherein the data sets comprise vectors of real numbers corresponding to the selected n-grams for each printer control language.

22. A printer according to claim 21 wherein for each printer command language a score is computed based upon the number of occurrences of each n-gram in the sample portion of the print job and the data sets for each printer command language, said scores being indicative of the likelihood of the print job being coded in each command language and directing the interpreting means to interpret the print job in accordance with the printer control language having the score indicating it is the most likely language in which the print job is encoded.

23. A printer according to claim 17 wherein the data sets comprise statistical data setting forth a measure of the likelihood of selected n-grams occurring in print jobs are indicative of print jobs encoded in a given printer control language by a given application.

24. A printer according to claim 17 wherein the data sets comprise statistical data setting forth a measure of the likelihood of combinations of selected n-grams occurring in print jobs are indicative of print jobs encoded in one printer control language by a given application or another.

25. A printer according to claim 17 wherein the data sets comprise statistical data setting forth a measure of the likelihood of selected n-grams occurring in print jobs are indicative of print jobs encoded in a given printer control language by a given application, said data weighted by the ability of said n-grams to distinguish a given printer control language from other printer control languages.

26. A printer according to claims 17, 18, 20 or 22 wherein the n-grams included in the data sets avoid sequences of signals representing device dependent characters or parameters.

27. A printer according to claims 17, 18, 20 or 22 wherein the n-grams included in the data sets avoid sequences of signals representing which are application dependent.

28. A printer according to claims 17, 20, 26 or 27 wherein the n-grams included in the data sets comprise command sequences which have a correlation with a printer control language.

29. A printer according to claims 17, 20, 26 or 27 wherein the n-grams included in the data sets map upper and lower case characters to the same character code.

* * * * *

UNITED STATES PATENT AND TRADEMARK OFFICE
CERTIFICATE OF CORRECTION

PATENT NO. : 5,293,466
DATED : March 8, 1994
INVENTOR(S) : Michael W. Bringmann

It is certified that error appears in the above-indentified patent and that said Letters Patent is hereby corrected as shown below:

Column 2 Line 16 after "language" insert --.--.

Column 26 Line 8 "a" should read --all--.

Column 33 Line 3 after "the" delete ",".

Column 33 Lines 56-57 "observations:" should read --observation:--.

Column 33 Line 67 ".assembles" should read --assembles--.

Claim 2 a) Line 38 Column 40 "generating" should read --gathering--.

Claim 28 Line 25 Column 44 "20, 26 or 27" should read --18, 20 or 22--.

Claim 29 Line 29 Column 44 "20, 26 or 27" should read --18, 20 or 22--.

Signed and Sealed this

Twelfth Day of July, 1994

Attest:

BRUCE LEHMAN

*Attesting Officer*    *Commissioner of Patents and Trademarks*